US009629482B1

(12) United States Patent
 Simone

(10) Patent No.: US 9,629,482 B1
(45) Date of Patent: Apr. 25, 2017

(54) REVERSIBLE AND ADJUSTABLE DISPLAY DEVICE

(71) Applicant: Christopher Simone, Port Washington, NY (US)

(72) Inventor: Christopher Simone, Port Washington, NY (US)

( * ) Notice: Subject to any disclaimer, the term of this patent is extended or adjusted under 35 U.S.C. 154(b) by 92 days.

(21) Appl. No.: 14/315,205

(22) Filed: Jun. 25, 2014

Related U.S. Application Data

(63) Continuation of application No. 29/471,310, filed on Oct. 30, 2013, now Pat. No. Des. 714,081, which is a continuation of application No. 13/066,468, filed on Apr. 15, 2011, now abandoned.

(60) Provisional application No. 61/400,132, filed on Jul. 23, 2010.

(51) Int. Cl.
 *A47F 5/08* (2006.01)
 *A47F 5/00* (2006.01)
 *A47F 5/13* (2006.01)

(52) U.S. Cl.
 CPC .......... *A47F 5/0018* (2013.01); *A47F 5/0043* (2013.01); *A47F 5/13* (2013.01)

(58) Field of Classification Search
 CPC .... A47F 5/0006; A47F 5/0018; A47F 5/0043; A47F 5/005; A47F 5/0056; A47F 5/0062; A47F 5/04; A47F 5/06; A47F 5/08; A47F 5/0876; A47F 5/101; A47F 5/103; A47F 5/13; A47F 2007/0092

USPC ......... 211/87.01, 88.01, 90.01, 90.02, 90.03, 211/90.04, 103, 153, 186, 187, 188, 189, 211/194; 108/106–108, 110; 312/183, 312/247

See application file for complete search history.

(56) References Cited

U.S. PATENT DOCUMENTS

| 1,554,137 | A | * | 9/1925 | Slifkin | A47B 57/52 |
| | | | | | 108/6 |
| 1,632,820 | A | | 6/1927 | Cofar | |
| 1,788,096 | A | * | 1/1931 | Friedemann | A47F 5/04 |
| | | | | | 108/96 |
| 1,915,727 | A | | 6/1933 | Friedemann | |
| 1,940,454 | A | | 12/1933 | Karnes | |
| 2,354,269 | A | * | 7/1944 | Marchand | A47B 57/50 |
| | | | | | 248/243 |
| 2,900,085 | A | | 6/1955 | Levy | |
| 2,839,350 | A | * | 6/1958 | Hill | A47B 57/425 |
| | | | | | 211/134 |
| 2,930,486 | A | | 3/1960 | Hoover | |
| 3,067,882 | A | * | 12/1962 | Ribbens | A47B 47/022 |
| | | | | | 108/102 |
| 3,528,558 | A | * | 9/1970 | Williams | A47F 5/0025 |
| | | | | | 211/126.1 |
| 3,915,097 | A | | 10/1975 | Young, Jr. | |
| 4,793,664 | A | * | 12/1988 | Jackson | A47B 57/00 |
| | | | | | 108/107 |

(Continued)

*Primary Examiner* — Joshua Rodden

(57) ABSTRACT

A reversible display device including a base-shelf having a planar surface, a back panel attached to the base-shelf, and at least one clip having an upward extending stop. The display device has a first orientation such that the planar surface is a base for the display device and a second orientation such that the planar surface is a top shelf for the display device. The clip is removably attached to the back panel such that the upward extending stop is oriented upward in either the first or the second orientation.

14 Claims, 9 Drawing Sheets

(56) References Cited

U.S. PATENT DOCUMENTS

| | | | | |
|---|---|---|---|---|
| 5,996,822 | A * | 12/1999 | Hopkins | A47B 67/02 108/92 |
| 6,089,387 | A * | 7/2000 | Varfolomeeva | A47B 57/06 211/106 |
| 7,374,047 | B2 * | 5/2008 | Bryson | A47F 5/116 108/107 |
| 8,424,466 | B2 | 4/2013 | Botkin | |
| 2009/0014400 | A1 * | 1/2009 | Nawrocki | A47F 5/0006 211/90.03 |
| 2011/0284485 | A1 * | 11/2011 | Sparkowski | A47B 57/20 211/59.2 |
| 2013/0233814 | A1 | 9/2013 | Gupta | |

\* cited by examiner

REVERSIBLE AND ADJUSTABLE DISPLAY DEVICE

CROSS-REFERENCE TO RELATED APPLICATIONS

This application is a continuation of application Ser. No. 29/471,310 filed Oct. 30, 2013, which is a continuation of application Ser. No. 13/066,468 filed Apr. 15, 2011, which claims the benefit of U.S. provisional patent application Ser. No. 61/400,132 filed Jul. 23, 2010, the contents of each of which are hereby incorporated by reference.

BACKGROUND

This application relates to the field of display devices.

The Pinewood Derby®, or pine car race or pine wood car race, is a popular annual racing event wherein children, with the help of their parent or other adult, build and paint small model cars from wood, usually from kits containing a block of pine, plastic wheels and metal nails as axles. The cars race by gravity power on a track and also are judged for design and originality. The event originated from Cub Scouting, a part of the program of the Boy Scouts of America® (BSA), available to boys from first through fifth grade, or 7 to 11 years of age. The official BSA Pinewood Derby® rules require fixed dimensions for the car's wheelbase and set maximum dimensions for the length, width, height, weight and underbody clearance. With the popularity of the Pinewood Derby® for Cub Scouts, other organizations have developed similar pine car events with slightly different rules, including Awana, Christian Service Brigade, Royal Ambassadors, Royal Rangers, Scouts Canada, Woodcar Independent Racing League and YMCA. The popularity of the Pinewood Derby® has also spawned countless adult racing groups and leagues. Other similar events for Cubs Scouts involving model vehicles are the Raingutter Regatta® and Space Derby®. The Raingutter Regatta® involves racing a handcrafted model sailboat within a water filled channel using lung power. The Space Derby® involves racing a rubber band propelled handcrafted model rocket along a taut cable.

Although not every pine car or other model wins an award, each is considered a trophy in itself. It is a testament to the many hours of hands-on, often painstaking labor and creativity shared by the child and parent or other adult. Naturally, therefore, racers are proud to display their vehicles as if displaying a trophy. Of course, the cars can be displayed simply out on a desk, shelf, table or other flat surface. But, as they are not generally designed to be durable—needing to last only a few races—leaving a car casually about could easily result in its damage or destruction. This stems from their repeated or even ordinary handling out of curiosity, for play, to show off, or to move out of the way as they compete for valuable space with other items invariably generated by youth through sports and other activities.

In the case of Cub Scouts, moreover, a boy could have built up to five pine cars during the five-year Cub Scout program. Participating in a pine car race, however, is not mandatory and may be prevented in any given year due to lack of time, effort, motivation, opportunity or similar factors. Thus, during his five-year enrollment as a Cub Scout, a boy could make as few as one car and as many as five cars.

There is presently no known display device or system able to accommodate, in advance, a varying or unknown number of pine cars or similar model vehicles without leaving a fixed component of the display empty in the interim, while at the same time being aesthetically pleasing for household use, compact in dimensions and allowing easy removal of the models while simultaneously showcasing it for maximum viewing effect. Similarly, there is no display device with the above features that allows for adjustments and has the ability to stand upright or be wall mounted to provide an additional top display shelf surface.

Although several pine car display devices are presently available, none adequately address the considerations stated above. Some of the known displays can accommodate only a single car in a fixed orientation, thus requiring one stand per vehicle. Other displays can accommodate multiple cars, but in a fixed number, and tend to occupy more space than the cars occupy individually. Thus, these devices are neither designed to conserve or maximize space nor can their capacity be adjusted to account for the number of cars a Cub Scout ultimately builds. Since it can never be known years in advance how many pine cars a youth will build, final display and settling on a particular capacity would have to wait until the child will no longer be involved in the event. In the meantime, the cars accumulate without any formal display, thereby increasing the risk of damage, destruction or loss while decreasing valuable surface space. Moreover, some displays require two mounting screws beneath the car that fit into corresponding notches on the base mounting bracket. In some cases, any metal weight plates affixed to the undercarriage of the pine car that interfere with the screws location would have to be removed to use this stand, thus requiring a modification in the original car. Regardless, the screws necessarily would generate holes in the finished car.

SUMMARY OF THE INVENTION

The present invention aims to provide an adjustable and reversible device for displaying pine cars or similar models easily, safely, creatively, efficiently, compactly and attractively, regardless of whether it is known in advance how many races or years one will participate in the event. In the present invention, a display clip to accommodate the length of an object and spaced at a distance forward to accommodate the width of an object, and with front upward catches to retain the object, affixes into channels in a display back panel spaced at intervals to allow easy removal and adjustment of the clip. The clip may be formed of resilient, rigid, springable wire or other material capable of achieving the illustrative embodiments and function to cradle for display a pine car or other model vehicle or similar object. The clip may be used to display the object cantilevered flat or at an angle of inclination depending on its angle, need only be of a size sufficient to retain the object and can be designed to be substantially concealed when in use. Clips can be added as needed and the back panel need only be a size sufficient to hold the clips with the objects.

These and other advantages and novel features of the present invention, as well as the details of the illustrated embodiments thereof, will be more fully understood from the following description and drawings.

BRIEF DESCRIPTION OF THE DRAWINGS

The present disclosure will become more readily apparent from the specific description accompanied by the following drawings, in which.

DETAILED DESCRIPTION OF THE PREFERRED EMBODIMENTS

Figure 1:
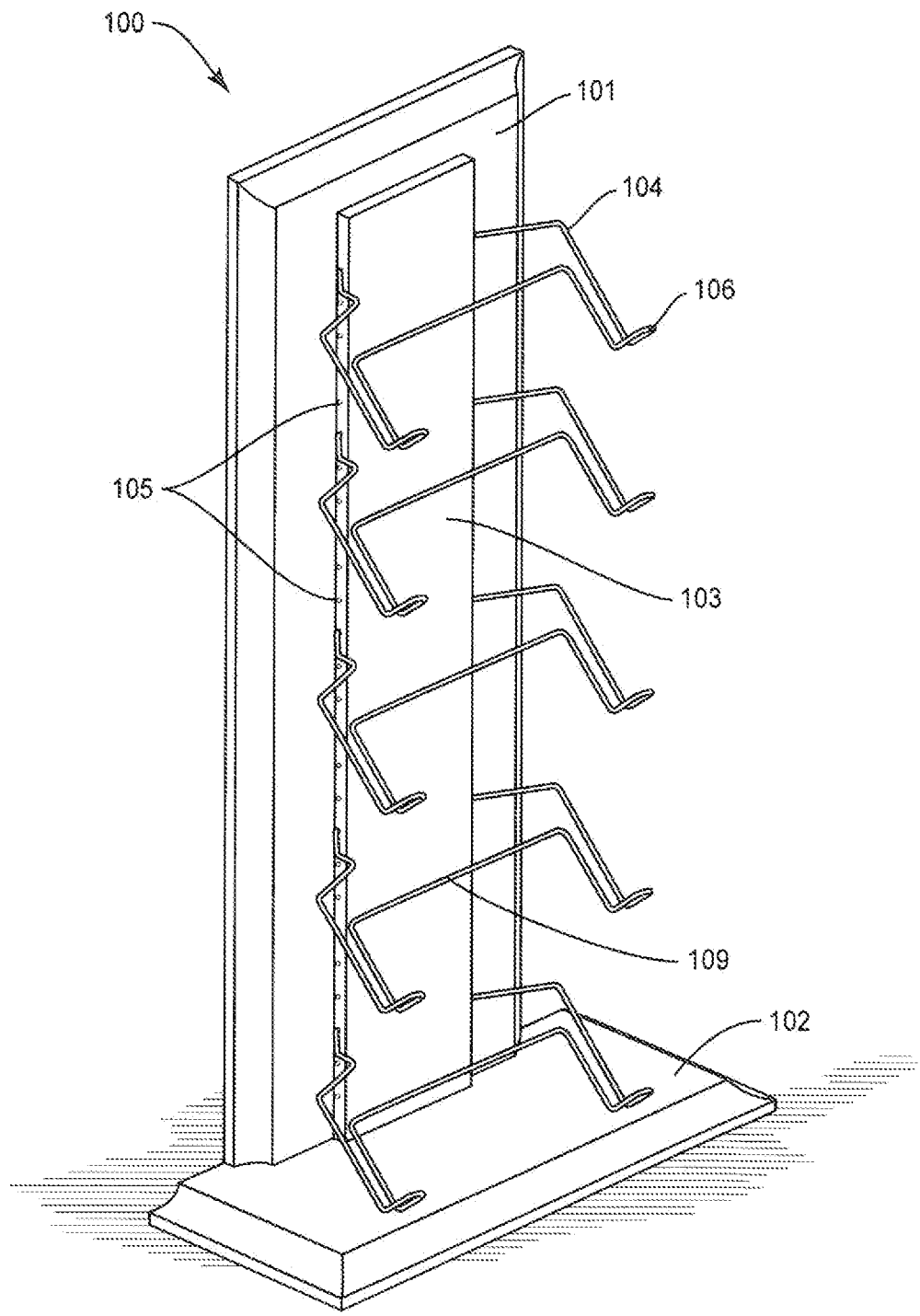
FIG. 1 shows a perspective view of one illustrative embodiment of the present invention in its upright orientation with the base-shelf serving as the bottom support with multiple adjustable display clips removably attached to the back panel.

Embodiments of the invention will be described with respect to the drawings, in which like reference numerals denote like elements.

FIG. 1 shows a perspective view of one illustrative embodiment of the display device 100 in a first orientation in which the base-shelf 102 serves as the bottom support for the display device 100. The back panel 101 extends perpendicularly and vertically upward from the base-shelf 102. The back edge of the base-shelf 102 is aligned flush with back planar surface of the back panel 101, but offsets are contemplated. The depth of the base-shelf 102 extends a distance forward of the front planar surface of the back panel 101. The width of the base-shelf 102 extends horizontally a distance past the width of the back panel 101 on each side. Although the dimensions shown are designed to stabilize the stand, other dimensions are contemplated.

In this illustrative embodiment, affixed to the front surface of the back panel 101 is a vertical center strip 103 of a width less than the width of the back panel 101 and of a length not exceeding the height of the back panel 101. The center strip 103 extends forward of the front planar surface of the back panel 101 a distance equal to the thickness of the center strip 103. Along the length of each vertical edge of the center strip 103 are bilateral apertures 105 spaced a distance apart into which one or more display clips 104 can be removably attached. Although described as two elements, the back panel 101 and the center strip 103 can be manufacture as a single component. In addition, although the display clips 104 are illustrated and described as held in place through the use of the apertures 105, other methods of attaching the display clips 104 to the display device 100 are contemplated. For example, display clips designed to receive a screw at the panel end can be used to removably affix the display clips to the display device at preset (i.e. predrilled) or user-determined (i.e. non-predrilled) locations. As another example, the apertures could be positioned in the back panel 101 perpendicular to the planar surface of the pack panel 101 with the display clip having ends that extend into the apertures. What is important is that the display clips are affixed to the display device to support an object to be displayed.

In this illustrative embodiment, the display clips 104 are configured at a downward angle maintained by the display clips being cantilevered from the apertures 105 in the center strip 103 and pressing against the back panel 101 with at least one front upward projection 106 to hold a display object in place. Other display clip 104 configurations are contemplated. What is required is the display clip 104 be designed to support the displayed object at its designated position.

Figure 2:
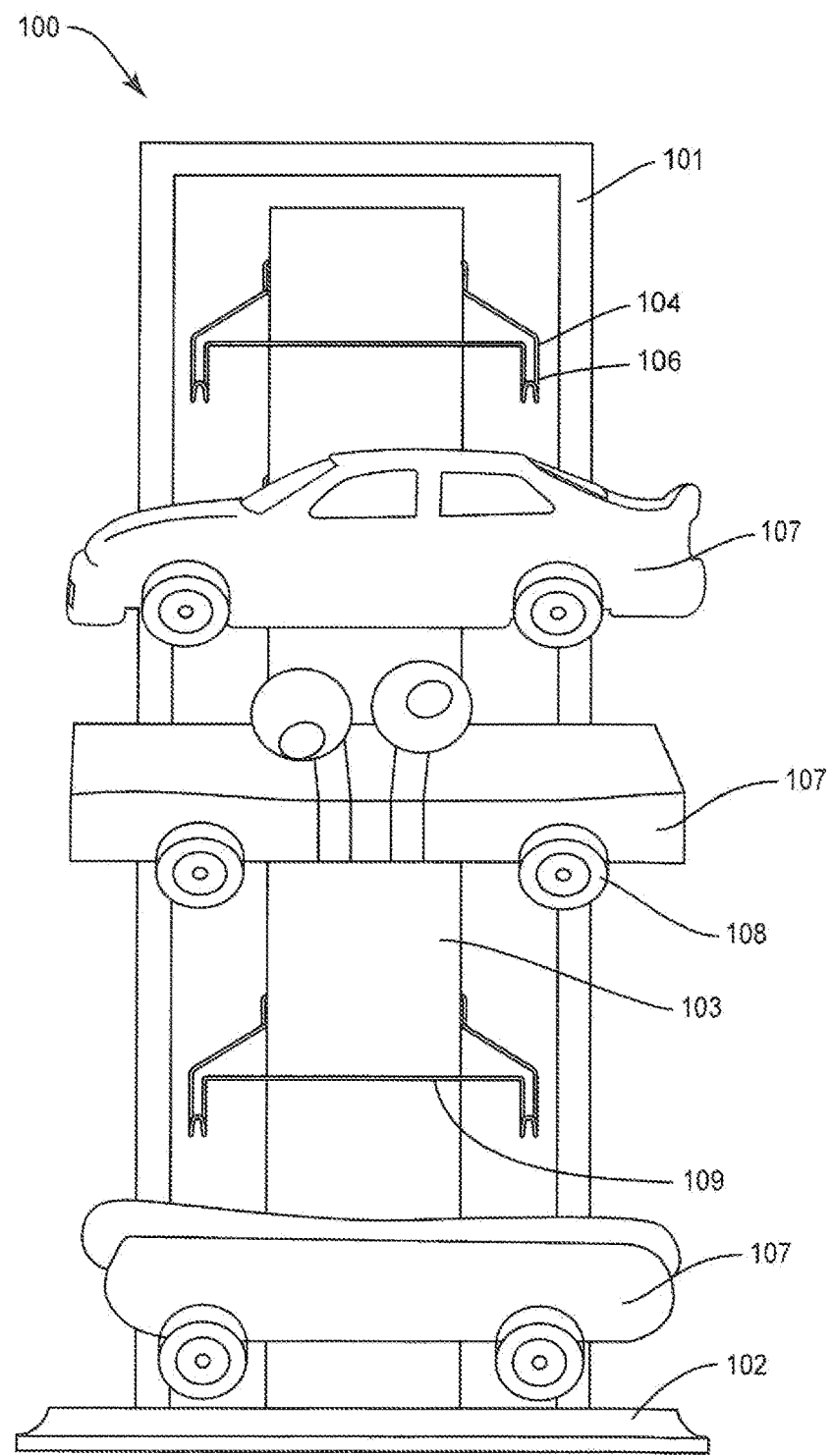
FIG. 2 shows the front view of the present invention illustrated in FIG. 1 displaying three objects.

FIG. 2 shows a front view of the display device illustrated in FIG. 1 with three objects displayed from display clips 104.

The varying width of objects can be accommodated by lengthening or shortening the width and depth of the display clip 104 and front upward catches 106 with corresponding variations made to the back panel 101, base-shelf 102 and center strip 103. As an example, if the model cars 107 shown by the illustrative embodiment in FIG. 2 were Pinewood Derby® cars, each would not exceed seven (7) inches in length or three (3) inches in height, the diameter of the wheels 108 would be fixed at one and three-sixteenth (1 3/16) inches, the distance between the center of the wheels 108 (wheelbase) would be fixed at four and three-eighth (4 3/8) inches, the width of the car at its widest point including the wheels 108 would not exceed two and three-quarter (2 3/4) inches and the clearance between the underside of the car and the lowest point on a wheel 108 would be a minimum of three-eighths (3/8) of an inch. Thus, for illustrative purposes, if model cars shown in FIG. 2 were seven (7) inches long, one and three-quarter (1 3/4) inches high, two and three-quarter (2 3/4) inches wide, with a wheelbase of four and three-eighth (4 3/8) inches and underside clearance of three-eighths (3/8) of an inch, the display clip 104 would have corresponding measurements of four (4) inches between the outermost sides of the front upward catches 106; two and three-quarter (2 3/4) inches from the face of the front upward catches 106 and the back pressing against the back panel 101; the front upward catches 106 would rise three eighths (3/8) of an inch from the bottom of the display clip to remain concealed behind the wheels 108 and inside the axles; and the crossbar 109 of the display clip 104 would be orientated one and one-eighth (1 1/8) inches on center behind the face of the front upward catches 106 to remain concealed beneath and substantially aligned with the center line of the model vehicle body 107. The distance between the apertures 105 would be approximately one-half (1/2) to three quarters (3/4) of an inch to allow incremental adjustment between model cars and to accommodate the maximum allowed height of the model car. These figures are for illustrative purposes, as other vehicle dimensions, displayed objects and/or display clip dimensions are contemplated.

Figure 3:
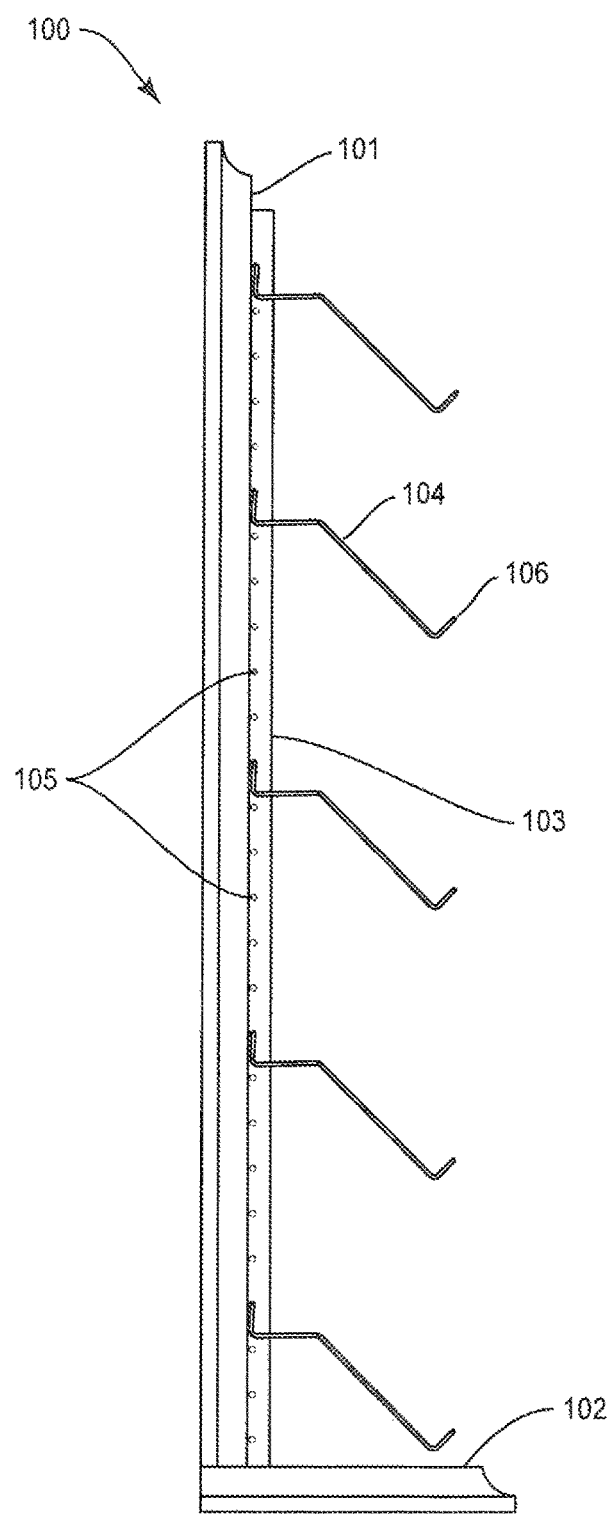
FIG. 3 shows the side view of the present invention illustrated in FIG. 1 with multiple adjustable display clips removably attached to the back panel.

FIG. 3 shows a side view of the display device illustrated in FIG. 1.

Figure 4:
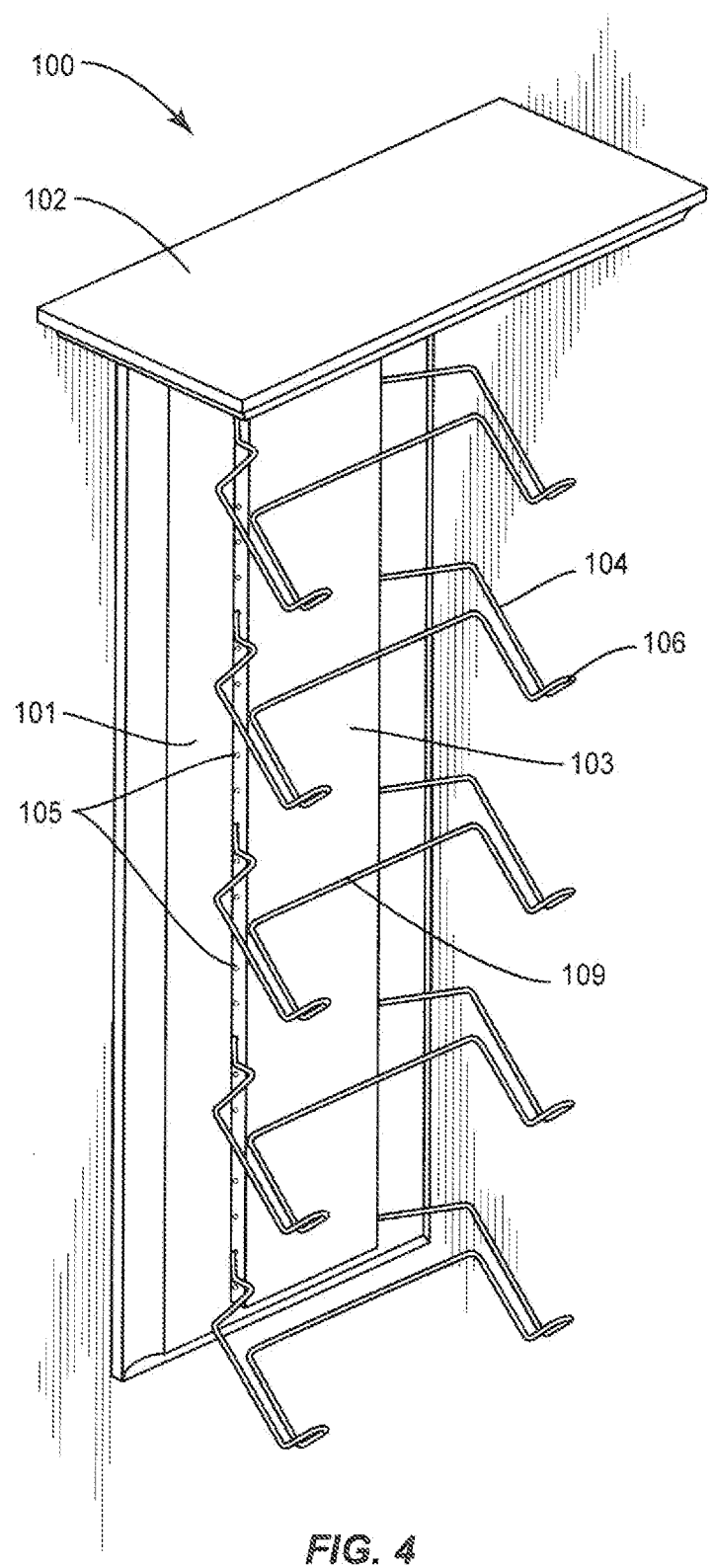
FIG. 4 shows a perspective view of one illustrative embodiment of the present invention in its wall mounted orientation with the base-shelf serving as the top shelf with multiple adjustable display clips removably attached to the back panel.

FIG. 4 shows a perspective view of one illustrative embodiment of the display device 100 in a second orientation in which the base-shelf 102 serves as the top shelf of the display device 100. The back panel 101 extends perpendicularly and vertically downward from the base-shelf 102. The back edge of the base-shelf 102 is aligned flush with back planar surface of the back panel 101. The depth of the base-shelf 102 extends a distance forward of the front planar surface of the back panel 101. The width of the base-shelf 102 extends horizontally a distance past the width of the back panel 101 on each side.

In this illustrative embodiment, affixed to the front surface of the back panel 101 is a vertical center strip 103 of a width less than the width of the back panel 101 and of a length not exceeding the height of the back panel 101. The center strip 103 extends forward of the front planar surface of the back panel 101 a distance equal to the thickness of the center strip 103. Along the length of each vertical edge of the center strip 103 are bilateral apertures 105 spaced a distance apart into which one or more display clips 104 can be removably attached.

In this illustrative embodiment, the display clips 104 are rotated 180 degrees from that illustrated in FIG. 1 to maintain a downward angle and at least one front upward projection 106 to a hold a display object 107 in place while being cantilevered from the apertures 105 in the center strip 103 and pressing against the back panel 101.

Figure 5:
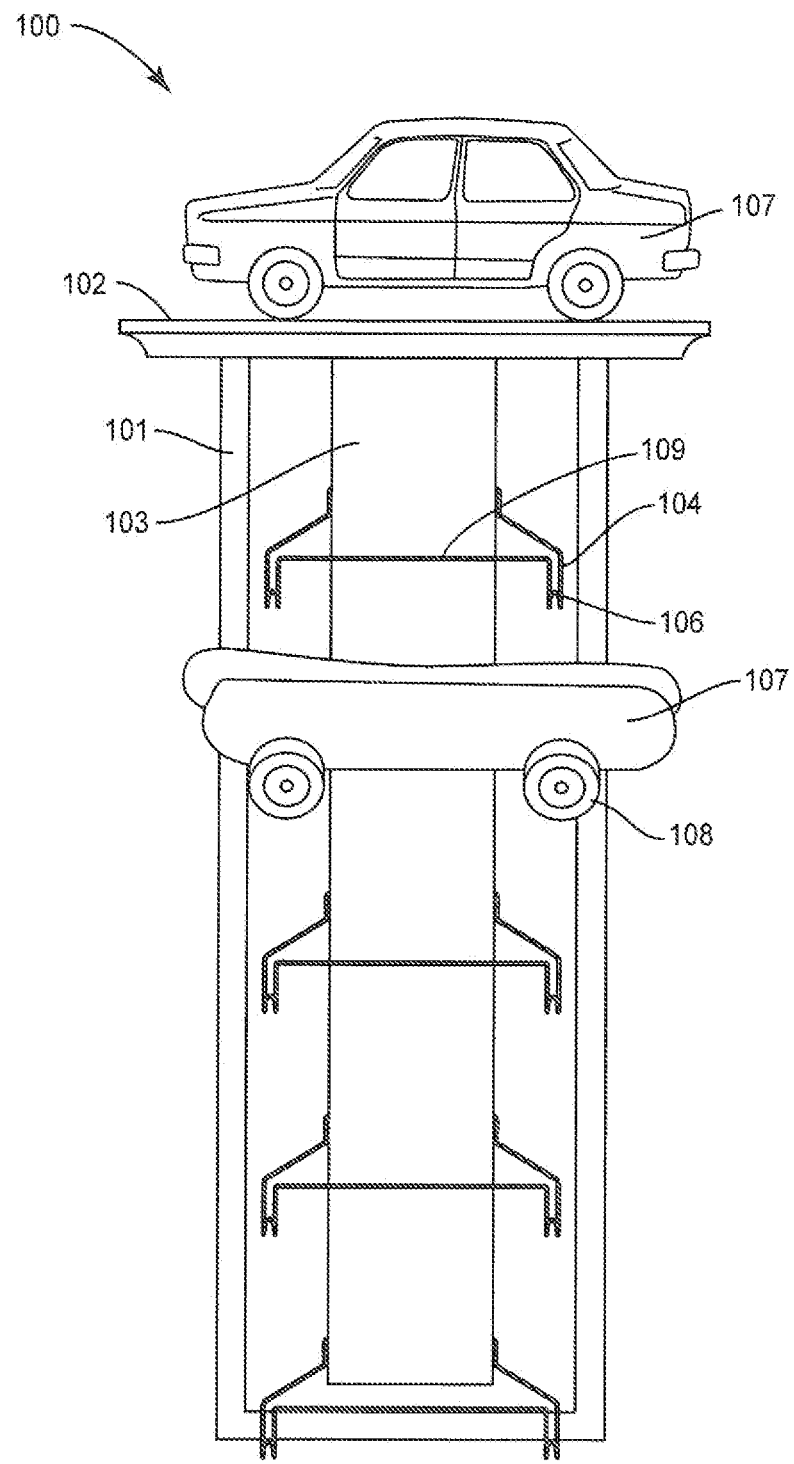
FIG. 5 shows the front view of the present invention illustrated in FIG. 4 displaying two objects.

FIG. 5 shows a front view of the display device 100 illustrated in FIG. 4 with one object 107 displayed from one of the display clips 104 and one from atop the base-shelf 102.

Figure 6:
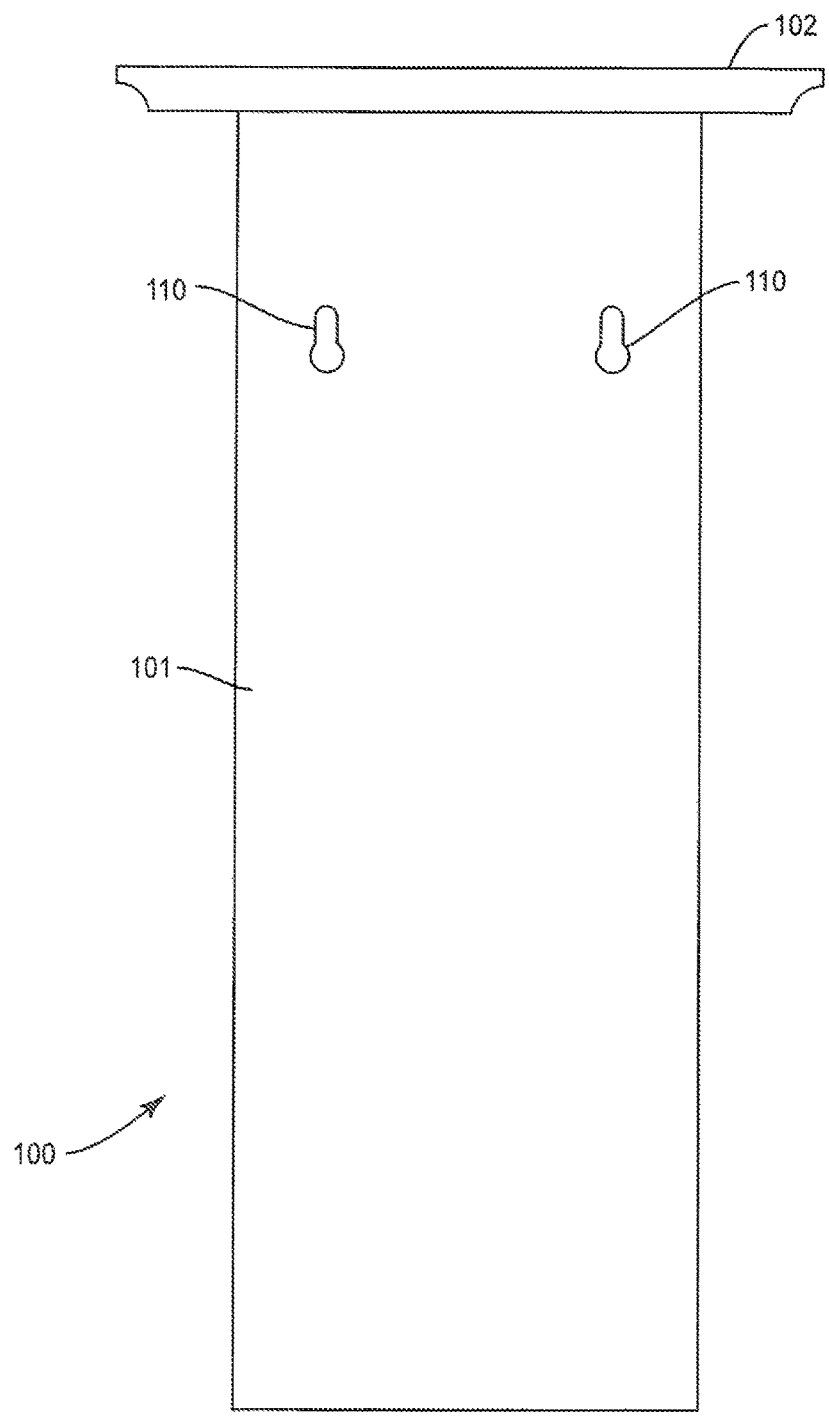
FIG. 6 shows the back view of the present invention illustrated in FIG. 4.

FIG. 6 shows a rear view of the display device 100 illustrated in FIG. 4 with two keyhole openings 110 spaced a distance apart and embedded partially into the thickness of the back panel 101 at a distance between the top and center of the back panel 101 into which the head of a fastener can be inserted to permit the display device 100 to be mounted to a vertical surface in this second orientation. Various other apparatuses and methods are available to mount objects to a vertical surface (e.g. a wall) and are contemplated for use with the display device described herein. For example, the various picture hangers are contemplated for use herein.

Figure 7:
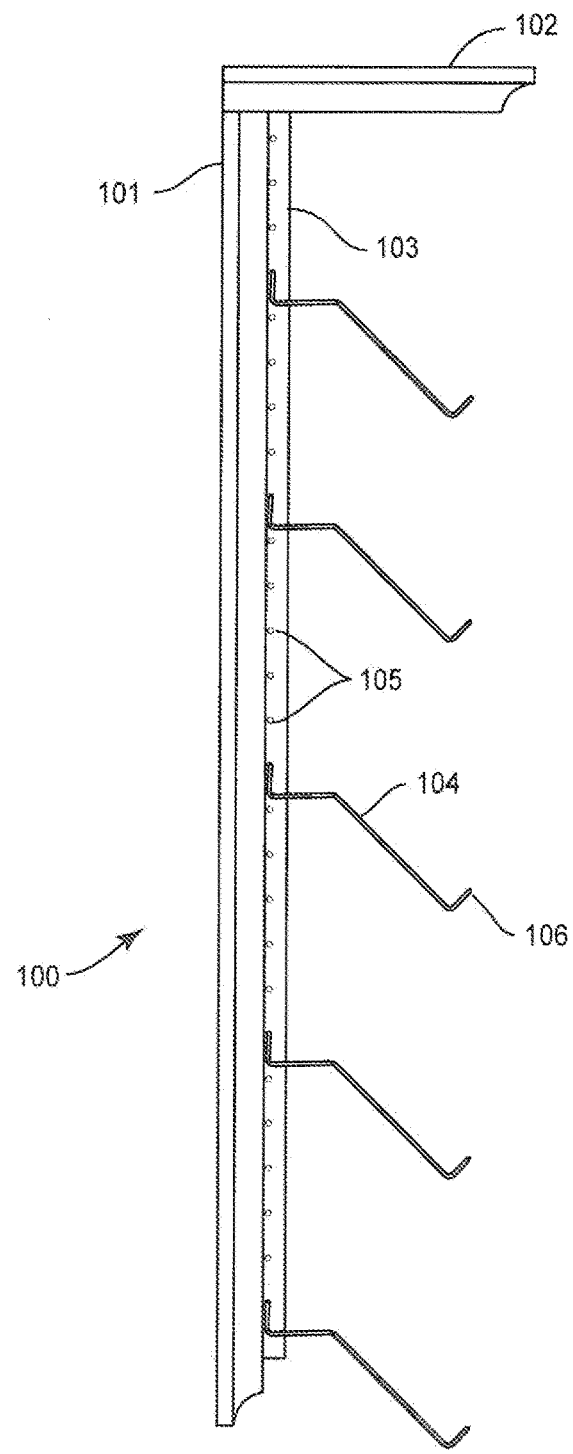
FIG. 7 shows a side view of the present invention illustrated in FIG. 4.

FIG. 7 shows a side view of the display device 100 illustrated in FIG. 4.

Figure 8:
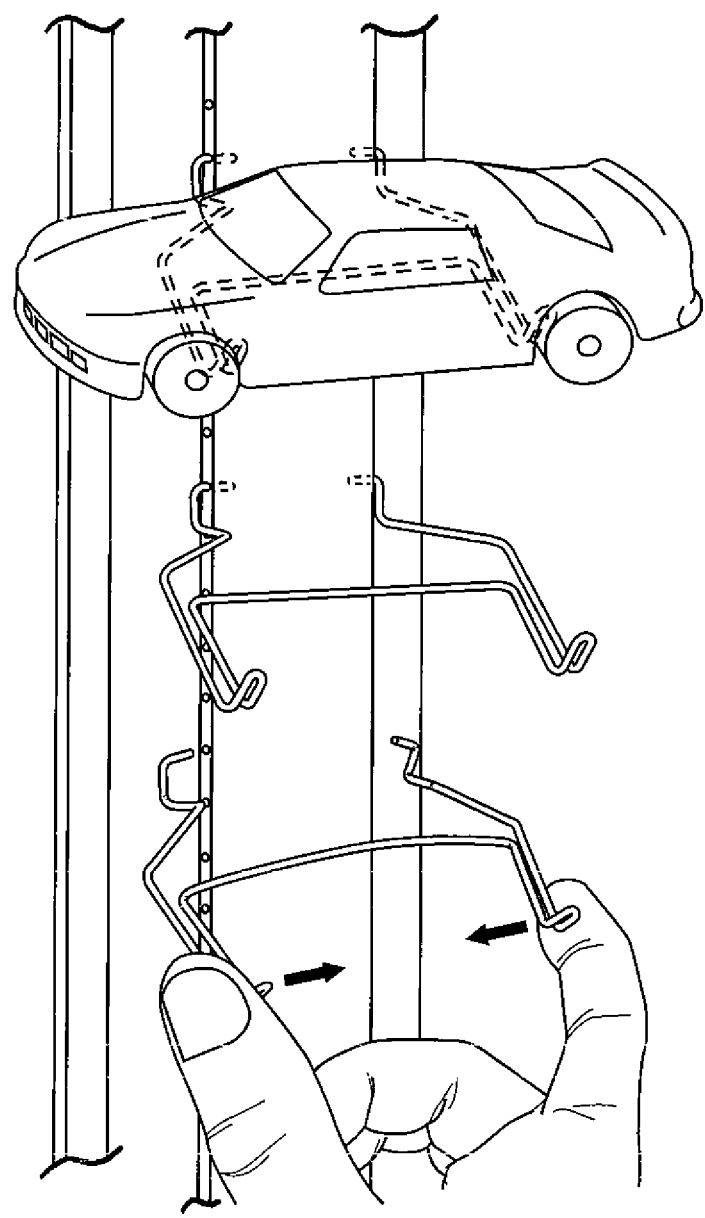
FIG. 8 shows one embodiment of the present invention with multiple clips attached to a back panel, displaying one object and illustrating the method of detaching the adjustable/removable display clips.

FIG. 8 shows a perspective view of a section of the display device 100 illustrated in FIG. 1 and FIG. 4. In this illustrative embodiment, the top display clip is shown in dotted lines to illustrate how a display object 107 rests upon the display clip 104. In this illustrative embodiment, the middle display clip 104 is partly shown in dotted lines to illustrate how the display clip 104 is removably attached to the apertures 105 and cantilevered from the center strip 103 while pressing against the back panel 101. In this illustrative embodiment, the bottom display clip 104 is shown unattached from the center strip 103 and illustrates how by squeezing the front upward catches 106 in opposite directions the display clip 104 releases from the apertures 105.

Figure 9:
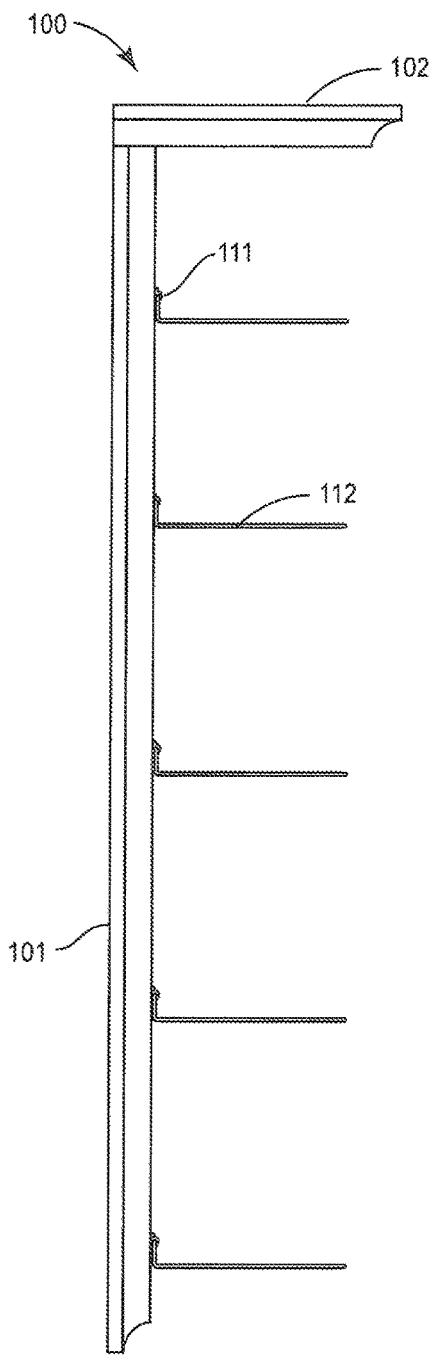
FIG. 9 shows another embodiment of the present invention in a wall mounted orientation with the base-shelf serving as a top shell with the display clips permanently fastened to the back panel in a horizontal orientation.

FIG. 9 shows a side view of the display device 100 illustrated in FIG. 4. In this illustrative embodiment, the center strip is not present and a display clip 112 is attached with fasteners 111 to the back panel 101 at a right angle without a downward angle or front upward catches 106. Attached in this way, the display clips 112 can be removably affixed to the display device 100 at preset (i.e. predrilled) or user-determined (i.e. non-predrilled) locations. In addition, although the display clips 112 are illustrated and described as held in place through the use of fasteners 111, other methods of attaching the display clips 112 to the display device 100 are contemplated. For example, apertures 105 could be positioned in the back panel 101 perpendicular to the planar surface of the pack panel 101 with the display clip having ends that extend into the apertures 105. What is important is that the display clips are affixed to the display device to support an object to be displayed.

Figure 10:
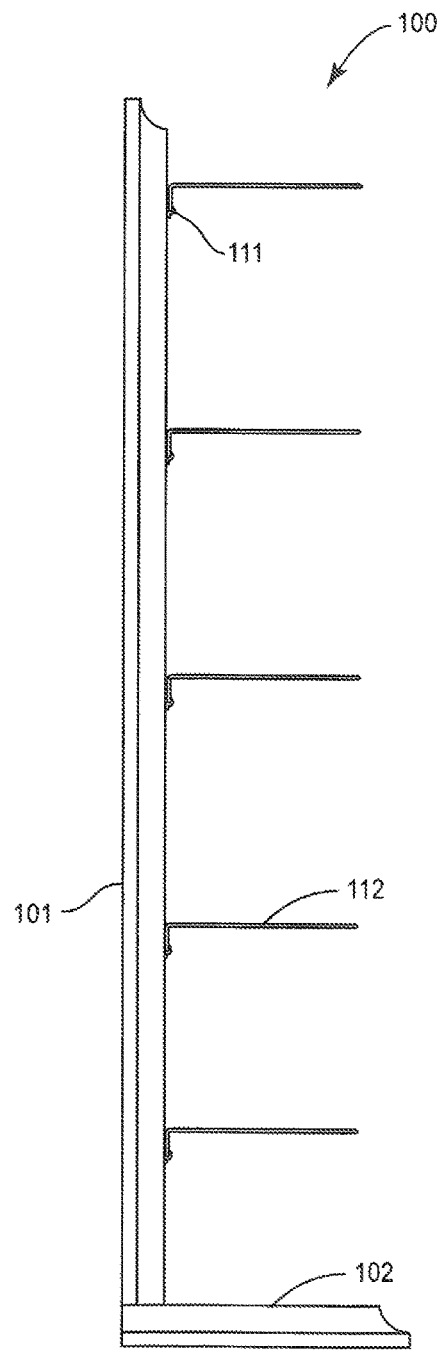
FIG. 10 shows another embodiment of the present invention in an upright orientation with the base-shelf serving as a bottom support base with the display clips permanently fastened to the back panel in a horizontal orientation.

FIG. 10 shows a side view of the display device 100 illustrated in FIG. 9 but rotated 180-degrees on its long axis. In this illustrative embodiment, the center strip is not present and a display clip 112 is attached with fasteners 111 to the back panel 101 at a right angle without a downward angle or front upward catches 106. Attached in this way, the display clips 112 can be removably affixed to the display device 100 at preset (i.e. predrilled) or user-determined (i.e. non-predrilled) locations. In addition, although the display clips 112 are illustrated and described as held in place through the use of fasteners 111, other methods of attaching the display clips 112 to the display device 100 are contemplated. For example, apertures 105 could be positioned in the back panel 101 perpendicular to the planar surface of the pack panel 101 with the display clip having ends that extend into the apertures 105. What is important is that the display clips are affixed to the display device to support an object to be displayed.

Accordingly, the display device shown and described in the various illustrative embodiments allows one to easily, creatively, efficiently, compactly and attractively display a model vehicle or pine car regardless of whether it is known in advance how many years one will participate in the racing event. In the case of Cub Scouts, as few as one and as many as the maximum five cars can be displayed from the same back panel display system, which also allows for adjustable spacing between the objects.

The display stand described herein can be manufactured from many materials, including, but not limited to, plastics, metals, wood and/or various combinations thereof. In addition, many of the components can be monolithic rather than separate components as described herein.

While the above description contains preferred embodiments, these should not be construed as limitations on the scope of this invention. Many variations are possible by, for example, fortifying, lengthening or shortening any component of the display device to suit the object to be displayed. Thus, the scope of the invention should not be determined by the embodiments provided for illustration only, but by the spirit and purpose of the appended claim.

What is claimed is:

1. A reversible display device, comprising:
   a base-shelf having a planar surface;
   a back panel attached to the base-shelf;
   a raised panel attached to the back panel and defining a series of holes along each side of the raised panel; and
   at least one clip having an upward extending stop and opposite facing protrusions that are extendable into two opposing holes of the series of holes, said clip removably attached to the back panel and configured to support an object for display,
   wherein said display device has a first orientation such that said planar surface is a base for the display device and a second orientation such that said planar surface is a shelf, and
   wherein said at least one clip is attachable to said back panel such that said upward extending stop is oriented upward in either the first or the second orientation, and
   wherein an end of the back panel located opposite to the base-shelf is a free end.

2. The reversible display device of claim 1, wherein the location of said at least one clip is adjustable along said raised panel.

3. The reversible display device of claim 1, wherein the base-shelf, the back panel, and the raised panel are monolithic.

4. The reversible display device of claim 1, further comprising means for attaching to a wall the display device in the second orientation.

5. A reversible display device, comprising:
- a horizontal member having a planar surface;
- a vertical back panel member attached to said horizontal member;
- a raised panel attached to the vertical back panel member and defining a series of holes along each side of the raised panel; and
- at least one clip having opposite facing protrusions that are extendable into two opposing holes of the series of holes, said clip removably attached to said raised panel, said clip configured to support an object for display, said clip defining a plane that is substantially parallel to a plane of the planar surface,
- wherein said display device has a first orientation such that said planar surface is a base for the display device and a second orientation such that said planar surface is a shelf, and
- wherein an end of the vertical back panel member located opposite to the horizontal member is a free end.

6. The reversible display device of claim 5, wherein the location of said at least one clip is adjustable along said raised panel.

7. The reversible display device of claim 5, wherein the horizontal member, the vertical back panel member, and the raised panel are monolithic.

8. The reversible display device of claim 5, further comprising means for attaching to a wall the display device in the second orientation.

9. The reversible display device of claim 5, wherein the clip is configured to support the object for display on either the first or second orientation.

10. A reversible display device, comprising:
- a base-shelf having a planar surface;
- a back panel attached to the base-shelf;
- a raised panel attached to the back panel and defining a series of holes along each side of the raised panel; and
- at least one clip having opposite facing protrusions that are extendable into two opposing holes of the series of holes, said clip removably attached to said raised panel, said clip configured to support an object for display,
- wherein said display device has a first orientation such that said planar surface is a base for the display device and a second orientation such that said planar surface is a top shelf, and
- wherein an end of the back panel located opposite to the base-shelf is a free end.

11. A reversible display device, comprising:
- a base-shelf having a planar surface;
- a back panel attached to the base-shelf;
- at least one clip removably attached to said back panel, said clip configured to support an object for display, said display device having a first orientation such that said planar surface is a base for the display device and a second orientation such that said planar surface is a top shelf; and
- means for attaching the display device to a wall only in the second orientation, and
- wherein an end of the back panel located opposite to the base-shelf is a free end.

12. The reversible display device of claim 11, wherein the location of said at least one clip is adjustable along said back panel.

13. The reversible display device of claim 11, wherein the base-shelf and the back panel are monolithic.

14. The reversible display device of claim 11, further comprising a raised panel attached to the back panel and defining a series of holes along each side of the raised panel, wherein said at least one clip has opposite facing protrusions that are extendable into two opposing holes of the series of holes.

* * * * *